Patented Aug. 5, 1924.

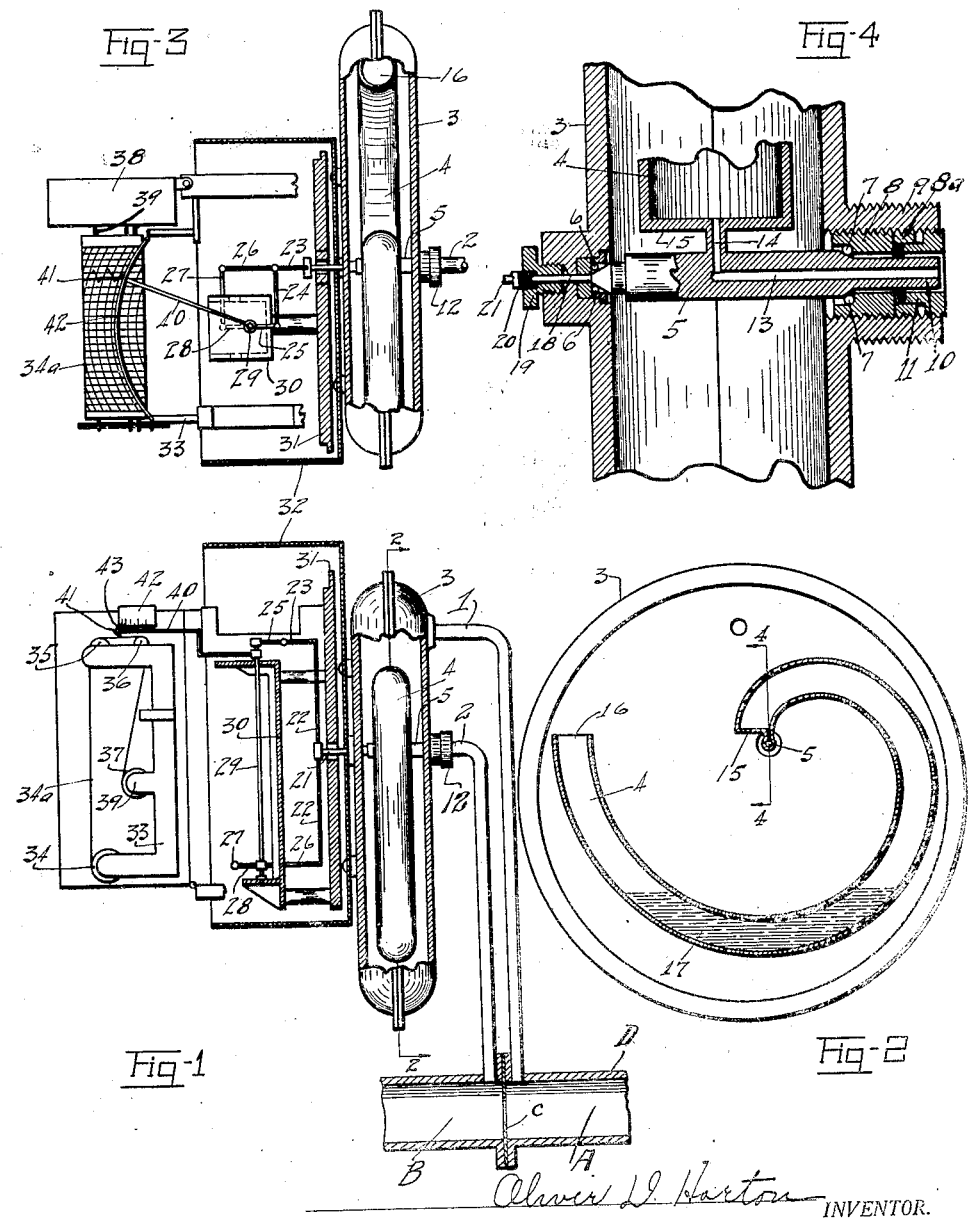

1,504,045

UNITED STATES PATENT OFFICE.

OLIVER D. HORTON, OF ERIE, PENNSYLVANIA, ASSIGNOR TO EQUITABLE METER COMPANY, OF PITTSBURGH, PENNSYLVANIA, A CORPORATION OF PENNSYLVANIA.

PRESSURE-MEASURING INSTRUMENT.

Application filed February 10, 1922. Serial No. 535,509.

*To all whom it may concern:*

Be it known that I, OLIVER D. HORTON, a citizen of the United States, residing at Erie, in the county of Erie and State of Pennsylvania, have invented new and useful Improvements in Pressure-Measuring Instruments, of which the following is a specification.

This invention is designed to indicate and register pressures, particularly a difference in pressure. One of the most sensitive and satisfactory pressure measuring devices for low pressures is the common U-tube. The U-tube, however, does not lend itself readily to recording the pressures to which it is subjected and in some instances does not provide a ready reading of pressures. With the present invention the efficiency of the U-tube is maintained and means are provided whereby differences of pressure may be recorded and readily observed.

The invention is illustrated in the accompanying drawings as follows:—

Fig. 1 shows a central vertical section of the device.

Fig. 2 a section on the line 2—2 in Fig. 1.

Fig. 3 a plan view, partly in section.

Fig. 4 an enlarged section on the line 4—4 in Fig. 2.

1 and 2 mark pipes connected to different sources of fluid pressure, as at the sides A and B of an orifice C in a conduit D which it is desired to measure. One of these may be atmosphere.

The pipe 1 leads to a case 3, which in effect is a mere enlargement of the passage. A U-tube 4 in the form of a scroll is swingingly mounted on a shaft 5, this U-tube being arranged in the case 3 and being subjected as a whole, therefore, to the pressure from the pipe 1. The shaft 5 is provided with ball bearings 6 and 7 so that it may swing freely. The ball bearing 7 is mounted in a screw-threaded fitting 8 in a screw-threaded projection 9 on the case and kept in adjustment by the locking nut 8ᵃ. The shaft has an extension 10 which projects through a stuffing box, or gland 11. The pipe 2 is secured on the projection 9 by a union 12, the pipe communicating with a passage 13 extending inwardly axially from the end of the shaft 5. The passage 13 communicates with a passage 14 leading to one end of the U-tube, the U-tube at its end being otherwise closed by a plate 15. This end of the U-tube, therefore, is closed against pressure in the case 3. The opposite end of the U-tube is open at 16 and is, therefore, subjected to this pressure. A liquid, such as mercury, 17 is placed in the U-tube.

It will be observed that the mercury is subjected at one end to the pressure delivered through the pipe 2 and at the opposite end to pressure coming through the pipe 1. If the pressure from the pipe 2 predominates the mercury is forced to the left as shown in Fig. 2 and this changes the center of gravity of the U-tube as it is weighted so that it swings toward the right to a point that will bring the center of gravity directly under the pivot. On the other hand if the pressure through the pipe 1 predominates the mercury is forced to the right and this shifts the center of gravity toward the right and in consequence there is a swinging of the U-tube toward the left to bring the center of gravity under the point of suspension. The quantity of mercury, therefore, must be nicely measured with relation to the weight of the U-tube in order to get a given swing of the U-tube with a given difference of pressure.

In order to indicate and register the movements of the U-tube I provide the following mechanism:—An extension 18 is provided on the end of the shaft through the bearing 6. This projects through a stuffing box 19.

A rock arm 22 extends above and below the shaft 21 and is fixed on the shaft. The upper end of the rock arm 22 has a forward bend 23 and a link 24 connects the arm with a rock arm 25. The lower end of the arm 22 has a bend 26, the front end of which is connected by a link 27 with a rock arm 28. The rock arms 25 and 28 are fixed on a vertical shaft 29 carried in bearings in a bracket 30. The bracket 30 projects from a frame 31. The frame 31 is mounted in a case 32, this case being secured to the case 3.

A recording instrument frame 33 projects from the frame 31. It is provided with a roll 37 on which a recording sheet 34ᵃ is wound, guide rolls 35 and 36 and a winding-on roll 34. These rolls are journaled in the frame and the roll 35 is driven from a clock mechanism 38 from the shaft 39 on which the roll 35 is mounted. Any clock mechanism desired may be used, the shaft 39 being timed simply to correlate with designated time periods on the sheet. A pen arm 40 is fixed on the shaft 29 and is provided with a pen 41 which operates on the sheet.

It will readily be seen as the U-tube swings under variations of pressure, this rotation or oscillation is communicated through the linkage above described to the pen 41 which swings back and forth over the sheets 34ª, thus recording the variations in pressure to which the U-tube is subjected. A scale 42 is arranged above the arm 40 and a finger 43 traverses the scale, thus indicating the pressure to which the U-tube is subjected at the moment.

The chart may be calibrated and provided with such designations as to indicate directly the volume of flow. This, of course, involves a relation between the size of conduit, the devices effecting a differential pressure and the graduating of the chart.

What I claim as new is:—

1. In a pressure measuring instrument, the combination of a U-tube; a swinging mounting for the U-tube; a case in which the U-tube is placed, one end of the U-tube being open to the case; and a pressure connection through the mounting to the other end of the U-tube.

2. In a pressure measuring instrument, the combination of a scroll-shaped U-tube; a swinging mounting for the U-tube; pressure connections to the ends of the U-tube; and means actuated by the tube indicating variations of pressure on the ends of the tube.

3. In a pressure measuring instrument, the combination of a pressure case; a scroll-shaped U-tube swingingly mounted in the case having one end open to the case; a shaft on which the U-tube is mounted, said shaft having a passage communicating with the U-tube; a pressure connection leading to the passage in the shaft; a recording device; and a connection between the shaft and the recording device recording the movements of the U-tube.

In testimony whereof I have hereunto set my hand.

OLIVER D. HORTON.